United States Patent [19]

Riegler et al.

[11] 4,185,499

[45] Jan. 29, 1980

[54] ARRANGEMENT FOR MONITORING AN OIL SUPPLY OF A LUBRICATION SYSTEM TO BE USED FOR HEAVY MACHINERY

[75] Inventors: Ernst Riegler, Enns; Manfred Schmidt, Linz, both of Austria

[73] Assignee: Voest-Alpine Aktiengesellschaft, Linz, Austria

[21] Appl. No.: 917,675

[22] Filed: Jun. 21, 1978

[30] Foreign Application Priority Data

Jun. 28, 1977 [AT] Austria .................................. 4559/77

[51] Int. Cl.² ............................................. G01F 1/115
[52] U.S. Cl. ..................................................... 73/229
[58] Field of Search .................. 73/194 R, 194 E, 229, 73/230, 231 R, 231 M, 253, 272 R, 272 A, 273, 272; 184/1 C; 116/114 PV, 115, 117 R; 200/81.9 R, 81.9 M

[56] References Cited

U.S. PATENT DOCUMENTS

| | | | |
|---|---|---|---|
| 3,433,070 | 3/1969 | Grimaldi | 73/229 |
| 3,583,220 | 6/1971 | Kawakami | 73/229 X |
| 3,636,767 | 1/1972 | Duffy | 73/229 |
| 3,774,882 | 11/1973 | O'Connor | 73/229 X |
| 3,949,606 | 4/1976 | Blancett | 73/229 |
| 3,969,940 | 7/1976 | Butcher | 73/253 |
| 4,114,560 | 9/1978 | Wegmann | 184/1 C X |
| 4,140,013 | 2/1979 | Hunger | 73/229 |

*Primary Examiner*—Donald Watkins
*Attorney, Agent, or Firm*—Brumbaugh, Graves, Donohue & Raymond

[57] ABSTRACT

An arrangement for monitoring the oil supply of a lubrication system for heavy machinery has an oil supply conduit, a liquid flow counter designed as a toothed wheel counter with two meshing, outwardly-toothed wheels. One of the wheels has a shaft to which a measuring wheel mounted outside of the oil supply conduit is mechanically connected. An impulse generator allocated to the measuring wheel and measuring the rotational speed thereof, an impulse receiver, and a signalling device to which the impulses are led by means of the impulse receiver complete the arrangement.

2 Claims, 2 Drawing Figures

ARRANGEMENT FOR MONITORING AN OIL SUPPLY OF A LUBRICATION SYSTEM TO BE USED FOR HEAVY MACHINERY

BACKGROUND OF THE INVENTION

The invention relates to an arrangement for monitoring the oil supply of a lubrication system for heavy machinery, in particular for converter tilting drives, which arrangement includes a liquid flow counter installed in an oil supply conduit and giving off impulses depending on the quantity of lubricant passing, as well as a signalling device.

In the field of heavy machinery construction, in particular with respect to drives for converters of steel making plants and other heavy drives, sufficient lubrication must be assured at all times, since an interruption of the lubrication can lead to grave operational disturbances which cause a stoppage of the converter. It has been known to install pressure measuring elements, such as throttles and the like in the oil supply conduits for this purpose. These, however, have the disadvantage that they are viscosity and temperature dependent and flow disturbances, e.g. a clogging of the conduit, are not immediately indicated.

Furthermore, it has been known to install liquid flow counters in the oil supply conduits, to give off impulses of a frequency proportionate to the quantity of liquid passing. These impulses are then led to a signalling device. Known liquid flow counters, however, allow a precise measurement of the quantities passing only within a certain temperature range, and furthermore, they are sensitive to on the consistency of the lubricant within this temperature range.

SUMMARY OF THE INVENTION

The present invention aims at providing an arrangement of the above-defined kind having an extremely robust and compact construction so that it is possible to use it in the field of heavy machinery construction, in particular for converter tilting devices operated under extreme conditions, while still avoiding disturbances and failures. The invention particularly aims at enabling an exact flow measurement corresponding to the actual quantity of lubricant passing within a wide temperature range and independent of the consistency of the lubricant. Faulty measurements caused by the pronounced temperature differences to which lubricant conduits, in particular those of converter tilting drives, are subjected, are reliably avoided.

According to the invention, these aims are achieved in that the liquid flow counter is designed as a toothed wheel counter with two meshing, outwardly-toothed wheels, the shaft of one toothed wheel being mechanically connected to a measuring wheel, e.g. a toothed wheel, mounted outside the supply conduit an impulse generator is allocated to the measuring which for measuring its rotational speed and the impulses of the generator are led to the signalling device by means of an impulse receiver.

BRIEF DESCRIPTION OF THE DRAWINGS

The invention will now be described by way of one embodiment thereof and with reference to the accompanying drawing, wherein.

DESCRIPTION OF AN EXEMPLARY EMBODIMENT

A supply conduit 1 for a lubricant supplies oil from a pump unit (not illustrated), via a volume regulating valve 2, to a toothed wheel counter 3. From the toothed wheel counter 3 the oil flows directly to the area to be lubricated, which is also not shown.

Figure 1:
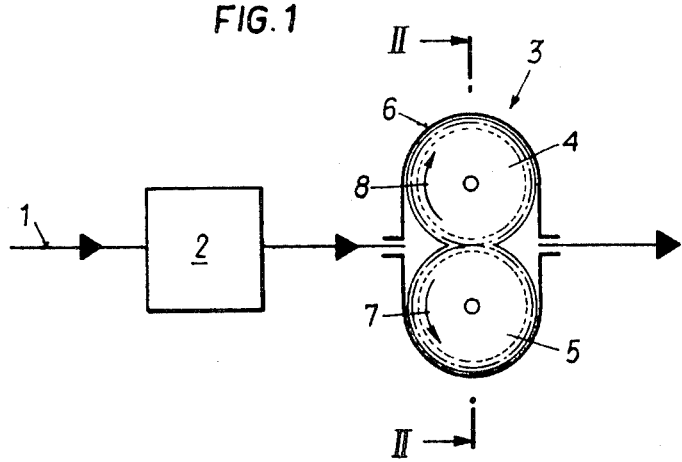
FIG. 1 is a schematic side view of a monitoring arrangement.

The toothed wheel counter substantially comprises two meshing outwardly-toothed wheels 4 and 5 closely surrounded by a housing 6. Because of the flow of oil the toothed wheels are caused to rotate in the direction of the arrows 7 and 8 entered in FIG. 1. Thus the oil acts as a driving means for the toothed wheel counter.

Figure 2:
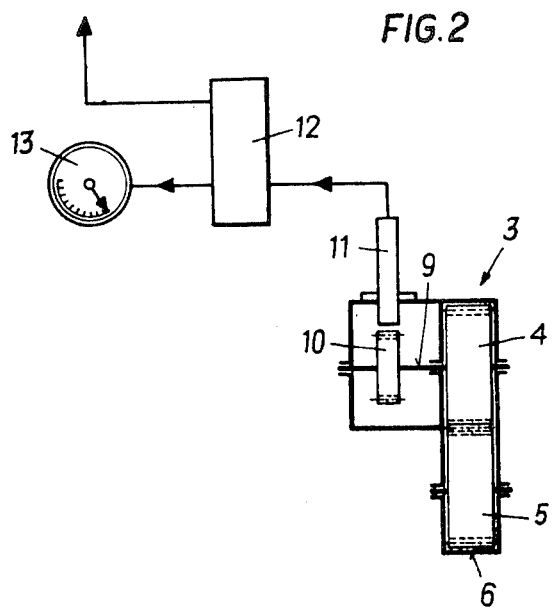
FIG. 2 is a section along line II—II of FIG. 1.

As can be seen from FIG. 2, the shaft 9 of the toothed wheel 4 is extended at one side. On the extension of the shaft, an outwardly-toothed wheel 10 is arranged so as to be secured against rotation with respect to the shaft.

The amount of oil flowing to the place to be lubricated via the toothed wheel counter 3 is proportionate to the number of rotations of the toothed wheels 4 and 5 and is thus also proportionate to the number of rotations of the toothed wheel 10 which serves as a measuring wheel for measuring the number of rotations of the toothed wheel 4. When the teeth of the toothed or measuring wheel 10 rotate past an impulse generator 11, the lines of force of the field produced by the impulse generator are cut and one impulse is given off per tooth of the measuring wheel 10 by the impulse generator which also functions as an impulse receiver. These impulses are sent to a speed monitor 12.

The speed monitor 12 constitutes a signalling device, which advantageously is coupled to the machine to be lubricated in such a manner that the machine is automatically stopped when the number of revolutions of the toothed wheel 10 falls below a certain minimum value. With a tilting drive of a vessel, such a coupling can be effected in a simple manner by switching off the electric drive. Suitably, the speed monitor is coupled to an indicator 13 whose indication corresponds to the amount of oil flowing through the toothed wheel counter.

Basically, a separate monitor device is allocated to each area to be lubricated.

Suitably, the conduits between the toothed wheel counter 3 and the area to be lubricated are kept as short as possible and are installed so as to be visible in order that a leak in the oil supply conduit between the toothed wheel counter and the area to be lubricated can be noticed immediately because of the oil emerging therefrom.

What we claim is:
1. An arrangement for monitoring an oil supply of a lubrication system used for heavy machinery, in particular for a converter tilting drive, comprising
   an oil supply conduit,
   a liquid flow counter designed as a toothed wheel counter installed in said oil supply conduit and including two meshing, outwardly-toothed wheels,
   a shaft being provided on one of said two meshing outwardly-toothed wheels,
   a measuring wheel mounted outside of the oil supply conduit and being mechanically connected to said shaft, thereby rotating with said shaft,
   an impulse generator allocated to said measuring wheel, said impulse generator being provided for measuring the rotational speed of said measuring wheel and generating impulses in dependence on the amount of oil passing said toothed wheel counter,
an impulse receiver for receiving said impulses from said impulse generator, and
a signalling device associated with said impulse receiver for indicating when the oil supply is below a preset limit and automatically controlling the machinery in response thereto, said impulses being led to said signalling device.

2. An arrangement as set forth in claim 1, wherein said measuring wheel is a further toothed wheel.

* * * * *

UNITED STATES PATENT AND TRADEMARK OFFICE
CERTIFICATE OF CORRECTION

PATENT NO. : 4,185,499
DATED : Jan. 29, 1980
INVENTOR(S) : Riegler et al.

It is certified that error appears in the above-identified patent and that said Letters Patent are hereby corrected as shown below:

Col. 1, line 42, "devices" should read --drives--;

Col. 1, line 57, "conduit an" should read --conduit. An--; and

Col. 1, line 58, "measuring which" should read --measuring wheel--.

Signed and Sealed this

Twentieth Day of May 1980

[SEAL]

Attest:

SIDNEY A. DIAMOND

Attesting Officer

Commissioner of Patents and Trademarks